United States Patent [19]

Crook

[11] 4,353,742
[45] Oct. 12, 1982

[54] COBALT-CONTAINING ALLOYS

[75] Inventor: Paul Crook, Fairford, England

[73] Assignee: Cabot Stellite Europe Limited, Swindon, England

[21] Appl. No.: 77,825

[22] Filed: Sep. 20, 1979

[30] Foreign Application Priority Data

Oct. 3, 1978 [GB] United Kingdom ............... 39117/78
Apr. 27, 1979 [GB] United Kingdom ................ 7914682

[51] Int. Cl.$^3$ ............................................. C22C 30/00
[52] U.S. Cl. ................................... 75/122; 75/134 C; 75/134 F
[58] Field of Search ................. 75/134 F, 122, 134 C, 75/171

[56] References Cited

U.S. PATENT DOCUMENTS

| | | | |
|---|---|---|---|
| 2,746,860 | 5/1956 | Binder et al. | 75/171 |
| 3,421,890 | 1/1969 | Baumel | 75/171 |
| 3,425,827 | 2/1969 | Baumel | 75/171 |
| 3,582,320 | 6/1971 | Herchenroeder | 75/171 |
| 4,078,922 | 3/1978 | Magyar et al. | 75/122 |

*Primary Examiner*—R. Dean
*Attorney, Agent, or Firm*—Jack Schuman; Robert F. Dropkin

[57] ABSTRACT

A wear-resistant alloy, which excluding impurities, has the following composition: (a) about 50 to 70% of cobalt, nickel and iron; (b) 27 to 35% of chromium; (c) 5 to 15% of molybdenum and/or tungsten; (d) 0.3 to 2.25% of carbon and/or boron; (e) 0 to 3% of silicon and/or manganese; (f) 0 to 5% of one or more of titanium, hafnium, zirconium, vanadium, niobium, and tantalum; (g) 0 to 5% of copper, and (h) 0 to 5% of one or more of the following rare earths: lanthanum, cerium, yttrium, and thorium. The cobalt is the range 25 to 40%, and the nickel in the range 4 to 12%. There is from 0 to 7.5% of constituents (f), (g) and (h). The iron is present in a quantity not exceeding 25%. If there is 2% or more of carbon and/or boron, there is more than 30% chromium. (All percentages by weight).

A welding or surfacing consumable which (ignoring the effect of dilution by substrate) is capable of depositing such an alloy may also be made.

14 Claims, No Drawings

COBALT-CONTAINING ALLOYS

BACKGROUND OF INVENTION

This invention relates to alloys which contain cobalt and which are resistant to wear and to surfacing and welding consumables which are capable of depositing such alloys.

Wear-resistant alloys based on the Co-Cr-W-C quaternary system are well known. They comprise a dispersion of hard carbide particles within a strong corrosion-resistant solid solution, rich in cobalt. The strength of the solid solution is such that only moderate volumes of carbide need be employed to achieve a given bulk hardness at both room and elevated temperature. Material toughness is thus appreciable.

The balance between solid solution strength and carbide level and thus between hardness and toughness of these alloys is such that they are able to withstand wear under both moderate and extreme conditions of temperature and stress (static and cyclic).

A range of such alloys is available, varying in room temperature hardness from approximately 300 VPN to 700 VPN, to suit different applications.

Typically, alloys of hardness of approximately 400 VPN contain 1 wt % carbon, 26 wt % chromium and 5 wt % tungsten, whilst those of hardness approximately 600 VPN contain 2.5 wt % carbon, 33 wt % chromium and 13 wt % tungsten. Not only do the chromium and tungsten contribute to the strength of the solid solution, they also act as carbide formers. The high strength of the cobalt-rich solid solution is associated with a high stacking fault density therein.

In recent years, cobalt has become an expensive commodity. The commercial need to reduce the level of cobalt in such alloys, whilst retaining their excellent wear characteristics, is therefore great.

Merely to substitute iron and nickel for some of the cobalt is an unsatisfactory expedient. A reduction in cobalt level in these alloys and a corresponding increase in iron or nickel bring about a reduction in solid solution strength and bulk hardness.

To compensate, increased levels of carbon (and hance carbide) can be employed. Many reduced cobalt alloys contain increased levels of carbide. The toughness of such materials and their ability to withstand severe wear situations are, however, limited. One example of such an alloy is a composition containing 37% by weight of cobalt and nickel; 10% by weight of molybdenum and tungsten; 23% by weight of iron; 27% by weight of chromium and 2.7% by weight of carbon.

There is a large number of published patent specifications that relate to alloys containing cobalt in smaller proportions than in conventional cobalt-based hard metal alloys. Examples of published patent specifications relating to steels containing nickel and cobalt are Austrian Pat. specification No. 136 854, German Pat. specification No. 160 410, and U.K. Pat. specifications Nos. 1,358,284 and 1 381 170. Such alloys, because they are steel, inherently lack the hardness of hard metal alloys based on cobalt. Examples of published patent specifications relating to nickel-based alloys (or alloys containing more nickel than cobalt and iron) which also contain cobalt and iron are U.S. Pat. Nos. 3,692,501 and 3,700,427, U.K. Pat. specifications Nos. 1,245,158, 880,805, 1,336,406 and 803,253, and Japanese specification No. 53-147615. U.K. Pat. specifications Nos. 424,463 and 1,064,109 both describe a range of compositions for hard metal alloys which allows for the cobalt level to fall well below that in conventional cobalt-based hard metal alloys and which also includes nickel and iron. However, the preferred alloys in both specifications contain over 45% by weight of cobalt. The proportions of iron and nickel that are disclosed are suitable more for an alloy containing 45% or more by weight of cobalt than for one containing less than 45% by weight of cobalt. U.K. Pat. specification No. 579,479 relates to a ferrous-based alloy for hard facing purposes containing 10 to 30% cobalt and 13 to 17% nickel. Japanese patent specification No. 53-14411 relates to a heat resistant alloy containing from 20 to 40% by weight of cobalt, from 10 to 30% by weight of nickel, and some iron. However, it contains less than 4% of molybdenum and tungsten.

The Invention

It is an object of the present invention to provide a range of reduced cobalt alloys which are acceptable alternatives to the conventional Co-Cr-W-C alloys. Compensation is achieved through enhanced strengthening of the solid solution, thus retaining to a large extent the balance between solid solution strength and carbide level of the Co-Cr-W-C alloys.

According to the invention, there is provided an alloy having essentially the following composition (excluding impurities):

| Constituents | % by weight of composition |
|---|---|
| (a) cobalt | 25 to 40 |
| (b) nickel | 4 to 12 |
| (c) iron | up to 25 |
| (d) chromium | 27 to 35 |
| (e) at least one element selected from the group molybdenum and tungsten | 5 to 15 |
| (f) at least one element selected from the group comprising carbon and boron | 0.3 to 2.25 |
| (g) at least one element selected from the group comprising silicon and manganese | 0 to 3 |
| (h) at least one highly active carbide former selected from the group comprising titanium, hafnium, niobium, zirconium, vanadium and tantalum | 0 to 5 |
| (i) copper | 0 to 5 |
| (j) at least one rare earth selected from the group comprising lanthanum, cerium, yttrium and thorium | 0 to 2 | wherein:
(i) the combined percentages by weight of cobalt, nickel and iron are in the range of about 50 to 70% by weight;
(ii) the total percentage of weight of constituents (h) to (j) is up to 7.5; and
(iii) there is more than 30% by weight of chromium present when there is at least 2% by weight of constituent(s) (f).

The invention also provides a heterogeneous surfacing or welding consumable capable on melting of producing an alloy which (ignoring the effect of any dilution thereof by substrate material) has essentially the following composition (excluding impurities):

| Constituent | % by weight of composition |
|---|---|
| (a) cobalt | 25 to 40 |
| (b) nickel | 4 to 12 |

| Constituent | % by weight of composition |
| --- | --- |
| (c) iron | up to 25 |
| (d) chromium | 27 to 35 |
| (e) at least one element selected from the group comprising molybdenum and tungsten | 5 to 15 |
| (f) at least one element selected from the group comprising carbon and boron | 0.3 to 2.25 |
| (g) at least one element selected from the group comprising silicon and manganese | 0 to 3 |
| (h) at least one highly active carbide former selected from the group comprising titanium, niobium, hafnium, zirconium, vanadium and tantalum | 0 to 5 |
| (i) copper | 0 to 5 |
| (j) at least one rare earth selected from the group comprising lanthanum, cerium, thorium and yttrium | 0 to 2 | wherein:
(i) the combined percentages by weight of cobalt, nickel and iron are in the range of about 50 to 70% by weight;
(ii) the total percentage by weight of constituents (h) to (j) is up to 7.5, and;
(iii) there is more than 30% by weight of chromium present when there is at least 2% by weight of constituent(s) (f).

We believe that alloys having properties akin to conventional Co-Cr-W-C alloys can be produced in accordance with this general formulatin. The selection of a particular alloy in accordance with the general formulation may be made so as to meet specific requirements (such as a specified hardness).

The enhanced strengthening of the solid solution is achieved by using, at relatively high atomic levels, chromium and molybdenum, the latter being in some instances partially or entirely 'replaced' by tungsten.

Typically, the alloys according to the invention may contain in the order of 30% (by weight) less cobalt than the conventional Co-Cr-W-C alloys with comparable properties.

We typically prefer to employ more than 10% by weight of iron and typically from 15 to 20% by weight of iron in the composition. The nickel helps to stabilise the face-centred cubic structure of the solid solution. If the alloy is formed into an arc welding consumable, it should be borne in mind that metal from the work being welded may intermix with the weld metal and thus dilute it. Thus, if the arc welding consumable is to be used for the arc welding of ferrous metal it will typically be desirable for more than 5% by weight of nickel to be present in the consumable.

If desired, the composition according to the invention may contain no tungsten. Preferably, it contains at least 2% and more preferably at least 5% by weight of molybdenum. Not only does this element provide solid solution strengthening; like chromium, it enhances the resistance to corrosion.

Preferably, the composition according to the invention contain no boron. If boron is present it preferably does not constitute more than 1% to the total weight of the composition, with carbon also being present.

If the combined weight of carbon and boron is greater than 1.5% by weight then preferably at least 1.25% of carbon is present. Generally, there is at least 0.3% by weight of carbon present in an alloy according to the invention. Typically, to be suitable for exposure to a wide range of conditions conducive to wear, the composition contains between 0.9 and 1.5% by weight of carbon with there being no boron present. At higher carbon levels the alloys tend to have increased hardness but reduced toughness, and vice-versa at lower carbon levels. It is a characteristic feature of alloys according to the invention that they have relatively good wear resistance while containing a relatively low level of cobalt and no exceptionally high level of carbon and boron.

Typically, from 0.5 to 2.0% (preferably from 0.5 to 1.5%) by weight of silicon and/or manganese are present. These constituents increase the fluidity of the alloys when molten.

If desired, alloys according to the invention may include up to 5% by weight of one or more elements which are highly active carbide formers. These elements modify the type and morphology of the carbides and release more molybdenum (and/or tungsten) to the solid solution. The highly active carbide former(s) may be selected from tantalum, niobium, hafnium, vanadium, titanium and zirconium. There may be up to 5% of such carbide former present. Preferably if one or more of such carbide formers are employed, titanium and/or niobium are selected. It is not essential, however, to include such 'highly active carbide formers'.

If desired, alloys according to the invention may contain up to 5% of copper which enhances their resistance to certain corrosive media. Copper is, however, neither an essential nor a preferred constituent of alloys according to the invention.

If desired, alloys according to the invention may contain up to 2% by weight of one or more rare earths. We believe that the inclusion of such rare earth(s) may be desirable if any alloy according to the invention is required to have particularly good resistance to oxidation at high temperatures (particularly above 1000° C.).

The preferred rare earth for this purpose is yttrium. However, other rare earths such as lanthanum, thorium or cerium may be used instead. The inclusion of a rear earth is not an esssential feature of the invention, but is optional.

A preferred composition is:

| | % by weight of the composition |
| --- | --- |
| cobalt | 25 to 40 |
| chromium | 27 to 35 |
| molybdenum and/or tungsten | 5 to 15 |
| nickel | 5 to 10 |
| carbon and/or boron | up to 2.25 |
| silicon and/or manganese | 0 to 3 |
| one or more of hafnium, zirconium, niobium, titanium, tantalum and vanadium | 0 to 5 |
| copper | 0 to 2 |
| one or more rare earths | 0 to 2 |
| iron | balance | wherein hafnium, zirconium, niobium, titanium, tantalum, vanadium, copper and the rare earths does not exceed 7.5% by weight (and preferably does not exceed 5% by weight), and there is not more than 25% by weight of iron present.

If tungsten is present and the aforesaid preferential carbide formers absent the sum of the percentage weight of molybdenum plus half the percentage weight of tungsten is preferably in the range 5 to 10%.

Preferably for a general purpose wear resistant alloy the cobalt is present in the range 28 to 38% by weight (and more preferably 28 to 35% by weight).

Particularly preferred compositions (excluding impurities) are as follows:

|  | % by weight of the composition |
|---|---|
| cobalt | 28 to 38 |
| chromium | 27 to 35 |
| molybdenum and/or tungsten | 5 to 10 |
| nickel | 5 to 10 |
| carbon | 0.5 to 2 |
| silicon and/or manganese | 0 to 3 |
| iron | balance (but not more than 25) |
| and |  |
| cobalt | 27 to 35 |
| chromium | 27 to 35 |
| molybdenum and/or tungsten | 5 to 10 |
| nickel | 5 to 10 |
| carbon | 0.5 to 2 |
| silicon and/or manganese | 0 to 3 |
| iron | balance (but not more than 25) |

Preferably tungsten and manganese are absent. Typically, there is from 8 to 24% by weight of iron. For a versatile wear-resistant composition, there is typically from 15 to 20% by weight of iron. There is typically from 0.9 to 1.5% by weight of carbon. Typically, there is from 0.5 to 2% (preferably 0.5 to 1.5%) by weight of silicon.

There is, as aforementioned, a range of conventional cobalt-tungsten-chromium-carbon alloys that is commercially available. In this range of alloys the proportions of chromium and tungsten present increase with increasing carbon. Analogously, in the alloys according to the invention, the more carbon that is employed, the greater is the proportion of chromium that should preferably be present, and the greater is the proportion of molybdenum and/or tungsten that should be employed. Moreover, the chromium can typically be at least 31% if the carbon is at least 1.2% by weight.

Typically, with increasing carbon, the combined proportions of iron, nickel and cobalt in the alloys are reduced. Typically, there is a greater proportion of iron than nickel in an alloy according to the invention. At a carbon and/or boron level of 2.25% by weight, the combined level of cobalt, nickel and iron may be 50% or just below (down, say, to 48% by weight).

The alloys according to the present invention may be prepared by mixing their respective ingredients and melting the resultant mixture, typically in a furnace, and typically at a temperature in the order of 1550° C. If desired, the melting may take place in a protective atmosphere of inert gas such as argon or nitrogen or under vacuum. The molten alloy may be formed into a powder by being atomised or by other means, may be made as a casting by, for example, poured into an appropriately shaped mould or may be formed into a cored wire or rod. The powder, wire or rod may be used as hard facing or welding consumables which may, if desired, be coated with a suitable flux. It may also, we believe, be possible to make forgings from alloys according to the invention, if their carbon content is typically less than 1% by weight.

If desired, engineering or other components may be made as a casting or forging from an alloy according to the invention. Alternatively, such components may be formed by compacting and/or sintering a powder which is an alloy according to the invention.

The alloys according to the invention may be employed in substantially all applications for which conventional cobalt-based wear resistant alloys are currently used.

A surfacing consumable according to the invention may be used to deposit a wear resistant coating on a substrate. A welding consumable according to the invention may be used to deposit wear resistant weld metal.

An alloy according to the invention may be shaped so as to provide the surfacing or welding consumable. It may also include materials which in use of the consumable are not intended to become an integral part of the metallic deposit. Such materials include for example flux and arc stabilisers. For example a rod or alloy according to the invention may be coated with flux and/or arc stabilisers to form a welding or surfacing consumable according to the invention.

It is possible to produce what is in effect a chemical equivalent to a welding or surfacing consumable according to the invention. In such an equivalent consumable the alloy is in effect formed in situ as a metallic deposit from the consumable. This metallic deposit may be diluted almost instantaneously by the base or substrate material diffusing into or intermixing with the deposit, or vice versa. For example, some but not all constituents of the metallic deposit may be present in one discrete part of the consumable and others in another part. Thus, for example, say cobalt and iron are present in an alloy form as a hollow tube, and, say, nickel, molybdenum, chromium, silicon and carbon as a powder within the tube. The tube may also typically contain a flux and arc stabilising materials. A typical example is that the tube is of an alloy containing 60% by weight of cobalt and 40% by weight of iron.

Typically the kind of consumable in which some but not all constituents are present in one discrete part of the consumable and others in another part may take the form of a cored wire. Typically, in such a consumable there will be near to 100% recovery of all the constituents of the consumable in the deposit excluding arc stabilisers, flux and the like, and also with the exception that not all the silicon and/or manganese will in general be recovered, particularly if the consumable contains a flux, in which instance, in use, a part of the silicon and/or manganese tends to enter the slag which forms on the surface of the metallic deposit. Typically, the consumables may therefore contain 1 to 2% by weight more silicon and/or manganese than it is intended to recover in the deposit.

The term 'impurities' as used herein encompasses both adventitious impurities and any element or substance deliberately added which does not influence significantly the properties of an alloy according to the invention. For example, small amounts of aluminum (say 1 to 2% by weight) may be included without significantly altering the properties of the alloy.

Desirably, relatively pure constituents are employed in making an alloy according to the invention as they are when making conventional cobalt-based wear-resistant alloys.

Examples of alloys according to the invention are set out in Tables 1, 2, 3 and 4. Some of their properties are set out in Table 5. Table 6 sets out the composition of conventional cobalt-based alloys. Table 7 illustrates the properties of the alloys set out in Table 6.

TABLE 1

| Alloy Ref. No. | % by weight | | | | | | | | |
|---|---|---|---|---|---|---|---|---|---|
| | Co | Cr | Ni | C | Fe | Si | Mo | Mn | B |
| 1 | 33 | 29 | 8 | 0.3 | 22.7 | 1 | 6 | — | — |
| 2 | 33 | 31 | 8 | 0.75 | 18.25 | 1 | 8 | — | — |
| 3 | 33 | 31 | 8 | 1.2 | 17.8 | 1 | 8 | — | — |
| 4 | 33 | 31 | 8 | 1.3 | 17.7 | 1 | 8 | — | — |
| 5 | 32 | 32 | 8 | 1.5 | 16.5 | 1 | 9 | — | — |
| 6 | 31 | 33 | 8 | 1.75 | 15.25 | 1 | 10 | — | — |
| 7 | 31 | 34.5 | 8 | 1.9 | 13.1 | 1 | 10.5 | — | — |
| 8 | 30.25 | 35 | 8 | 2.25 | 11.75 | 0.75 | 12 | — | — |
| 9 | 33 | 31 | 8 | 0.75 | 17.75 | 1 | 8 | — | 0.5 |
| 10 | 33 | 31 | 8 | 1.3 | 17.7 | — | 8 | 1 | — |
| 11 | 33 | 31 | 4 | 1.3 | 21.7 | 1 | 8 | — | — |
| 12 | 33 | 31 | 6 | 1.3 | 19.7 | 1 | 8 | — | — |
| 13 | 33 | 31 | 10 | 1.3 | 15.7 | 1 | 8 | — | — |
| 14 | 33 | 31 | 12 | 1.3 | 13.7 | 1 | 8 | — | — |
| 15 | 25 | 31 | 10 | 1.3 | 23.7 | 1 | 8 | — | — |
| 16 | 28 | 31 | 8 | 1.3 | 22.7 | 1 | 8 | — | — |
| 17 | 35 | 31 | 8 | 1.3 | 15.7 | 1 | 8 | — | — |
| 18 | 40 | 31 | 6 | 1.3 | 12.7 | 1 | 8 | — | — |

TABLE 2

| Alloy Ref. No. | % by weight | | | | | | | | | | | | | | |
|---|---|---|---|---|---|---|---|---|---|---|---|---|---|---|---|
| | Co | Cr | Ni | C | Fe | Si | Mo | Nb | Cu | W | Y | Ti | Zr | V | Ta |
| 19 | 31 | 29 | 8 | 1.3 | 22.3 | 1 | 5.5 | 2 | — | — | — | — | — | — | — |
| 20 | 31 | 31 | 8 | 1 | 17 | 1 | 8 | 3 | — | — | — | — | — | — | — |
| 21 | 31 | 31 | 8 | 0.75 | 15.25 | 1 | 8 | 5 | — | — | — | — | — | — | — |
| 22 | 32 | 31 | 8 | 1.3 | 17.7 | 1 | 8 | — | — | — | 1 | — | — | —1 | — |
| 23 | 31 | 31 | 8 | 1.3 | 16.2 | 1 | 8 | — | 2.5 | — | — | — | — | — | — |
| 24 | 33 | 31 | 8 | 1.2 | 17.8 | 1 | 5 | — | — | 3 | — | — | — | — | — |
| 25 | 31 | 31 | 8 | 1.3 | 17.7 | 1 | 8 | — | — | — | — | 2 | — | — | — |
| 26 | 31 | 31 | 8 | 1 | 17 | 1 | 8 | — | — | — | — | — | 3 | — | — |
| 27 | 31 | 31 | 8 | 1.3 | 17.7 | 1 | 8 | — | — | — | — | — | — | 2 | — |
| 28 | 31 | 31 | 8 | 1.3 | 17.7 | 1 | 8 | — | — | — | — | — | — | — | 2 |
| 29 | 31 | 27.7 | 8 | 0.45 | 24.75 | 1 | 5.6 | 1.5 | — | — | — | — | — | — | — |
| 30 | 33 | 31 | 8 | 1.3 | 17.7 | 1 | 3 | — | — | 5 | — | — | — | — | — |

TABLE 3

| Alloy Ref. No. | % by weight (as determined by analysis) | | | | | | | | |
|---|---|---|---|---|---|---|---|---|---|
| | Co | Cr | Ni | C | Fe | Si | Mo | Mn | B |
| 31 | 31.7 | 30.4 | 8.4 | 1.3 | 17.5 | 1.1 | 7.9 | — | — |
| 32 | balance | 30.9 | 8.0 | 1.6 | 18.0 | 0.4 | 8.5 | — | — |
| 33 | balance | 32.5 | 8.0 | 1.7 | 15.3 | 0.4 | 10.4 | — | — |
| 34 | balance | 33.6 | 8.2 | 2.0 | 14.8 | 0.5 | 8.4 | — | — |
| 35 | balance | 35.2 | 8.6 | 2.2 | 12.0 | 0.8* | 11.0 | — | — |
| 36 | balance | 30.0 | 7.7 | 0.9 | 19.5 | 0.6 | 8.5 | — | 0.5* |
| 37 | 33.3 | 29.8 | 8.0 | 1.4 | 17.0 | 0.6 | 8.2 | 0.8 | — |
| 38 | balance | 28.8 | 4.1 | 1.3 | 24.3 | 0.4 | 7.9 | — | — |
| 39 | balance | 29.1 | 5.7 | 1.4 | 22.9 | 0.5 | 7.4 | — | — |
| 40 | balance | 29.4 | 9.6 | 1.3 | 18.5 | 0.5 | 7.6 | — | — |
| 41 | balance | 28.9 | 11.4 | 1.3 | 16.6 | 0.5 | 7.3 | — | — |
| 42 | balance | 29.6 | 9.7 | 1.4 | 25.4 | 0.6 | 7.3 | — | — |
| 43 | balance | 29.3 | 7.8 | 1.3 | 24.4 | 0.6 | 7.2 | — | — |
| 44 | balance | 29.5 | 8.1 | 1.4 | 26.4 | 0.7 | 6.5 | — | — |
| 45 | balance | 29.7 | 6.0 | 1.4 | 16.6 | 0.6 | 5.9 | — | — |

Notes
balance indicates percent by weight of cobalt plus impurities
*indicates nominal composition

TABLE 4

| Alloy Ref. No. | % by weight (as determined by analysis) | | | | | | | | | | | | | | |
|---|---|---|---|---|---|---|---|---|---|---|---|---|---|---|---|
| | Co | Cr | Ni | C | Fe | Si | Mo | Nb | Cu | W | Y | Ti | Zr | V | Ta | Mn |
| 46 | balance | 30.8 | 8.8 | 0.8 | 15.2 | 1* | 7.1 | 5* | — | — | — | — | — | — | — | — |
| 47 | balance | 29.3 | 7.9 | 1.4 | 19.2 | 0.5 | 8.3 | — | — | — | 1* | — | — | — | — | — |
| 48 | balance | 29.2 | 7.4 | 1.4 | 19.2 | 0.5 | 8.0 | — | 2.4 | — | — | — | — | — | — | — |
| 49 | 33.3 | 30.1 | 8.0 | 1.3 | 17.0 | 1.0 | 5.1 | — | — | 4.1 | — | — | — | — | — | — |
| 50 | balance | 29.3 | 7.9 | 1.4 | 22.8 | 6.8 | 7.6 | — | — | — | — | 2* | — | — | — | — |
| 51 | balance | 30.0 | 7.9 | 1.1 | 16.1 | 1.0 | 8.5 | — | — | — | — | — | 3* | — | — | — |
| 52 | balance | 30.7 | 7.8 | 1.4 | 18.6 | 0.5 | 7.9 | — | — | — | — | — | — | 2.0 | — | — |
| 53 | balance | 29.2 | 8.3 | 1.5 | 19.2 | 0.6 | 7.9 | — | — | — | — | — | — | — | 2* | — |
| 54 | balance | 28.2 | 7.7 | 0.5 | 21.6 | 1* | — | 4.2 | — | 6.1 | — | — | — | — | — | 1* |
| 55 | balance | 29.9 | 7.8 | 1.3 | 18.5 | 0.4 | — | — | — | 8.2 | — | — | — | — | — | — |
| 56 | balance | 29.9 | 7.8 | 1.3 | 18.8 | 1* | — | — | — | 11.5 | — | — | — | — | — | — |
| 57 | balance | 30.6 | 9.1 | 1.2 | 19.0 | 0.4 | 6.3 | — | — | 1.4 | — | — | — | — | — | — |
| 58 | balance | 28.2 | 7.8 | 0.3 | 24.1 | 0.5 | 5.7 | — | — | 2.25* | — | — | — | — | — | — |

Notes
balance indicates percent by weight of cobalt plus impurities
*indicates nominal composition

TABLE 5

| Alloy Ref. | Hardness (Vickers Pyramid No.) | Ultimate Tensile Strength (at room temperature) | | % Elongation (%) (at room temperature) | Corrosion in aqua regia at room temperature (% weight loss in 100 hours) | Oxidation at 900° C. (% weight gain in 25 hours) |
|---|---|---|---|---|---|---|
| | | Ton F/in² | H Bar | | | |
| 31 | 434 | 45 | 69.5 | 1.0 | 5.8 | 0.016 |
| 32 | 425 | 39 | 60 | 0.5 | 8.0 | 0.020 |
| 33 | 512 | 36 | 56 | 0.5 | 7.7 | 0.018 |
| 34 | 494 | 38 | 59 | 0.5 | 7.1 | 0.023 |
| 35 | 585 | 23 | 35.5 | <0.5 | 9.3 | 0.016 |
| 36 | 373 | 44 | 68 | 1.0 | 5.8 | 0.010 |
| 37 | 442 | 39 | 60 | 1.0 | 6.9 | 0.019 |
| 38 | 397 | 40 | 62 | <0.5 | 6.7 | 0.025 |
| 39 | 395 | 43 | 66 | 0.5 | 7.6 | 0.028 |
| 40 | 374 | 42 | 65 | 0.5 | 8.0 | 0.016 |
| 41 | 363 | 41 | 63 | 1.0 | 7.7 | 0.014 |
| 42 | 362 | 43 | 66 | 1.0 | 8.3 | 0.019 |
| 43 | 369 | 44 | 68 | 0.5 | 7.8 | 0.031 |
| 44 | 373 | 44 | 68 | 1.0 | 7.6 | 0.023 |
| 45 | 391 | 44 | 68 | 1.0 | 7.6 | 0.024 |
| 46 | 468 | 35 | 54 | 0.5 | 3.2 | 0.022 |
| 47 | 407 | 22 | 34 | 0.5 | 7.5 | 0.010 |
| 48 | 377 | 43 | 66 | 1.0 | 7.6 | 0.020 |
| 49 | 436 | 43 | 66 | <0.5 | 2.4 | 0.013 |
| 50 | 395 | * | * | * | 6.4 | 0.025 |
| 51 | 391 | * | * | * | 4.4 | 0.039 |
| 52 | 400 | 46 | 71 | 1.0 | 6.9 | 0.112 |
| 53 | 416 | 45 | 69.6 | 0.5 | 5.9 | 0.022 |
| 54 | 363 | 45 | 69.5 | 3.0 | 3.8 | 0.016 |
| 55 | 375 | 49 | 76 | 1.5 | 5.4 | 0.015 |
| 56 | 392 | 42 | 65 | 0.5 | 4.7 | 0.016 |
| 57 | 356 | 34 | 52.5 | <0.5 | 6.6 | 0.021 |
| 58 | 330 | 47 | 73 | 2.0 | 3.6 | 0.020 |

Notes
*indicates that no measurement was taken
For the oxidation and corrosion tests, standard samples of 30 cm² were used.

TABLE 6

| Alloy Ref. | Co | Cr | Ni | C | Fe | Si | W |
|---|---|---|---|---|---|---|---|
| A | 63 | 26 | 1 | 1 | 3 | 1 | 5 |
| B | 56 | 29 | 1 | 1.8 | 2.2 | 1 | 9 |
| C | 47 | 33 | 1 | 2.5 | 2.2 | 1 | 13 |

TABLE 7

| Alloy Ref. | Hardness (Vickers Pyramid No.) | Ultimate Tensile Strength (at room temperature) Ton F/in² | Ultimate Tensile Strength (at room temperature) H Bar | % Elongation (%) (at room temperature) | Corrosion in aqua regia at room temperature (% weight loss in 100 hours) | Oxidation at 900° C. (% weight gain in 25 hours) |
| --- | --- | --- | --- | --- | --- | --- |
| A | 420 | 54 | 80 | 1.0 | 6.5 | 0.019 |
| B | 502 | 43 | 66 | 0.5 | 4.9 | 0.015 |
| C | 567 | 26 | 40 | 0.5 | 3.8 | 0.012 |

All the alloys that were subjected to the tests set out in Table 5 were formed as identical castings.

The alloy A (see Table 3) is sold widely under the STELLITE ® trademark as STELLITE alloy No. 6 (STELLITE is a registered trademark of Cabot Corporation). We believe that alloy No. 31 according to the invention is an acceptable alternative for most, if not all, commercial applications of 'Stellite 6'.

We have found that at 700° C., the hardness of an alloy such as No. 31 is about 80% of that of alloy A, and at 800° C. the UTS of alloy No. 31 is greater than that of alloy A. Moreover, the oxidation resistance of alloy No. 31 in the temperature range 600° to 900° C. is approximately equal to that of alloy A. Generally, the resistance of alloy No. 31 to commonly encountered acid solutions is greater than that of alloy A.

The alloys according to the invention are less affected by iron dilution during arc welding than are conventional cobalt-based hard metal alloys (such as STELLITE alloy No. 6). Selection of an appropriate alloy according to the invention will depend upon the surfacing technique and conditions of deposition.

I claim:

1. An alloy consisting essentially of the following composition (excluding impurities):

| | Constituents | % by weight of composition |
| --- | --- | --- |
| (a) | cobalt | 25 to 40 |
| (b) | nickel | 4 to 12 |
| (c) | iron | more than 10, up to 25 |
| (d) | chromium | 27 to 35 |
| (e) | at least one element selected from the group consisting of molybdenum and tungsten | 5 to 15 |
| (f) | at least one element selected from the group consisting of carbon and boron | 0.3 to 2.25 |
| (g) | material selected from the group consisting of silicon and manganese | 0 to 3 |
| (h) | material selected from the group consisting of titanium, hafnium, niobium, zirconium, vanadium and tantalum | 0 to 5 |
| (i) | copper | 0 to 5 |
| (j) | material selected from the group consisting of lanthanum, cerium, yttrium and thorium | 0 to 2 | wherein:
(i) the combined percentages by weight of cobalt, nickel and iron are in the range of about 50 to 70% by weight;
(ii) the total percentage by weight of constituents (h) to (j) is up to 7.5%;
(iii) there is more than 30% by weight of chromium present when there is at least 2% by weight of constituent(s) (f); and
(iv) the % by weight iron is greater than the % by weight nickel.

2. An alloy according to claim 1, including at least 2% by weight of molybdenum.

3. An alloy according to claim 1, in which the total percentage by weight of constituents (h) to (j) is up to 5.

4. An alloy according to claim 3, including from 28 to 38% by weight of cobalt.

5. An alloy according to claim 4, including from 5 to 10% by weight of nickel.

6. An alloy according to claim 1, including 0.5 to 1.5% by weight of carbon.

7. An alloy according to claim 6, including 0.9 to 1.5% by weight of carbon.

8. An alloy according to claim 1, containing more than 10 and up to 24% by weight of iron.

9. An alloy according to claim 8, containing from 15 to 20% by weight of iron.

10. A heterogeneous surfacing or welding consumable capable on melting of producing an alloy which (ignoring the effect of any dilution thereof by substrate material) consists essentially of the following composition (excluding impurities):

| | Constituent | % by weight of composition |
| --- | --- | --- |
| (a) | cobalt | 25 to 40 |
| (b) | nickel | 4 to 12 |
| (c) | iron | more than 10, up to 25 |
| (d) | chromium | 27 to 35 |
| (e) | at least one element selected from the group consisting of molybdenum and tungsten | 5 to 15 |
| (f) | at least one element selected from the group consisting of carbon and boron | 0.3 to 2.25 |
| (g) | [at least one element] material selected from the group consisting of silicon and manganese | 0 to 3 |
| (h) | [at least one highly active carbide former] material selected from the group of titanium, niobium, hafnium, zirconium, vanadium and tantalum | 0 to 5 |
| (i) | copper | 0 to 5 |
| (j) | [at least one rare earth addition] material selected from the group consisting of lanthanum, cerium, thorium and yttrium | 0 to 2 | wherein:
(i) the combined precentages by weight of cobalt, nickel and iron are in the range of about 50 to 70% by weight;
(ii) the total percentages by weight of constituents (h) to (j) is up to 7.5%;
(iii) there is more than 30% by weight of chromium present when there is at least 2% by weight of constituents (f); and
(iv) the % by weight iron is greater than the % by weight nickel.

11. An alloy according to claim 1, devoid of constituent (i).
12. An alloy according to claim 1, devoid of constituent (j).
13. A heterogeneous surfacing or welding consumable according to claim 10, devoid of constituent (i).
14. A heterogeneous surfacing or welding consumable according to claim 10, devoid of constituent (j).

* * * * *